(12) United States Patent
Hannigan et al.

(10) Patent No.: US 9,795,877 B2
(45) Date of Patent: Oct. 24, 2017

(54) CENTRALIZED SYSTEM PROVING NOTIFICATION OF INCOMING PROJECTILES

(71) Applicant: Elwha LLC, Bellevue, WA (US)

(72) Inventors: Russell J. Hannigan, Sammamish, WA (US); Roderick A. Hyde, Redmond, WA (US); Muriel Y. Ishikawa, Livermore, CA (US); 3 ric Johanson, Seattle, WA (US); Jordin T. Kare, San Jose, CA (US); Tony S. Pan, Bellevue, WA (US); Clarence T. Tegreene, Mercer Island, WA (US); Charles Whitmer, North Bend, WA (US); Lowell L. Wood, Jr., Bellevue, WA (US); Victoria Y. H. Wood, Livermore, CA (US)

(73) Assignee: Elwha LLC

( * ) Notice: Subject to any disclaimer, the term of this patent is extended or adjusted under 35 U.S.C. 154(b) by 109 days.

(21) Appl. No.: 14/933,265

(22) Filed: Nov. 5, 2015

(65) Prior Publication Data
US 2016/0169635 A1 Jun. 16, 2016

Related U.S. Application Data

(63) Continuation of application No. 14/746,454, filed on Jun. 22, 2015.
(Continued)

(51) Int. Cl.
G08B 1/08 (2006.01)
A63F 13/285 (2014.01)
(Continued)

(52) U.S. Cl.
CPC ............ A63F 13/285 (2014.09); F41A 33/00 (2013.01); F41H 13/00 (2013.01); G06F 3/011 (2013.01);
(Continued)

(58) Field of Classification Search
CPC .................................. G08B 21/02; F41H 1/00
(Continued)

(56) References Cited

U.S. PATENT DOCUMENTS 5,565,840 A 10/1996 Thorner et al.
6,411,276 B1 6/2002 Braun et al.
(Continued)

OTHER PUBLICATIONS

PCT International Search Report; International App. No. PCT/US2015/064778; dated Mar. 21, 2016; pp. 1-3.
(Continued)

Primary Examiner — Phung Nguyen

(57) ABSTRACT

Described embodiments include a real-time system, method, and apparatus. A system includes an incoming object sensor configured to acquire data indicative of a trajectory of an incoming projectile. The system includes a human tracking circuit configured to acquire data indicative of a location of a human present in a monitored geographic area. The system includes a processing circuit configured to (i) receive the data indicative of the trajectory of the incoming projectile; (ii) predict a spatial relationship of the trajectory of the incoming projectile relative to the location of the human; and (iii) determine a suggested movement by the human to evade the incoming projectile. The system includes a transmitter circuit configured to transmit the suggested movement to evade the incoming projectile.

31 Claims, 12 Drawing Sheets

Related U.S. Application Data

(60) Provisional application No. 62/090,751, filed on Dec. 11, 2014.

(51) Int. Cl.

| | |
|---|---|
| *G06F 3/01* | (2006.01) |
| *F41H 13/00* | (2006.01) |
| *G08B 21/02* | (2006.01) |
| *F41A 33/00* | (2006.01) |
| *G08B 3/10* | (2006.01) |
| *G08B 6/00* | (2006.01) |
| *F41B 11/00* | (2013.01) |

(52) U.S. Cl.
CPC .............. *G06F 3/012* (2013.01); *G06F 3/016* (2013.01); *G08B 3/10* (2013.01); *G08B 6/00* (2013.01); *G08B 21/02* (2013.01); *F41B 11/00* (2013.01)

(58) Field of Classification Search
USPC ....... 340/539.13, 573.1, 691.1, 815.4, 384.1; 342/27, 53
See application file for complete search history.

(56) References Cited

U.S. PATENT DOCUMENTS

| | | | |
|---|---|---|---|
| 6,430,450 B1 | 8/2002 | Bach-y-Rita et al. | |
| 6,714,213 B1 | 3/2004 | Lithicum et al. | |
| 6,831,640 B2 | 12/2004 | Shih et al. | |
| 6,965,312 B2 | 11/2005 | Lerg | |
| 7,132,928 B2 | 11/2006 | Perricone | |
| 7,570,426 B2 | 8/2009 | Rodgers et al. | |
| 7,696,860 B2 | 4/2010 | Gilson et al. | |
| 7,696,919 B2 | 4/2010 | Moraites | |
| 8,308,558 B2 | 11/2012 | Thorner | |
| 8,362,945 B2 | 1/2013 | Nguyen et al. | |
| 9,107,012 B2* | 8/2015 | Lord ................... | H04R 29/005 |
| 9,146,251 B2* | 9/2015 | Moraites .................. | G06T 7/70 |
| 9,464,949 B2* | 10/2016 | Mahlen ..................... | G01L 1/10 |
| 2005/0073439 A1 | 4/2005 | Perricone | |
| 2005/0225443 A1 | 10/2005 | Lerg | |
| 2006/0166678 A1 | 7/2006 | Karaoguz et al. | |
| 2006/0241718 A1 | 10/2006 | Tyler et al. | |
| 2007/0139167 A1 | 6/2007 | Gilson et al. | |
| 2008/0120029 A1 | 5/2008 | Zelek et al. | |
| 2009/0213114 A1 | 8/2009 | Dobbins et al. | |
| 2009/0319058 A1 | 12/2009 | Rovaglio et al. | |
| 2010/0040238 A1 | 2/2010 | Jang et al. | |
| 2011/0025492 A1 | 2/2011 | Bravo | |
| 2012/0124470 A1 | 5/2012 | West et al. | |
| 2012/0146291 A1 | 6/2012 | Walker | |
| 2012/0200667 A1 | 8/2012 | Gay et al. | |
| 2012/0256779 A1 | 10/2012 | Nguyen et al. | |
| 2013/0021195 A1* | 1/2013 | Gould ....................... | G01S 7/35 |
| | | | 342/113 |
| 2013/0218456 A1 | 8/2013 | Zelek et al. | |
| 2014/0218184 A1 | 8/2014 | Grant et al. | |
| 2014/0287806 A1* | 9/2014 | Balachandreswaran | A63F 13/00 |
| | | | 463/7 |
| 2015/0268475 A1 | 9/2015 | Lee et al. | |

OTHER PUBLICATIONS

Berkley, Jeffrey J.; "Haptic Devices"; May 5, 2003; pp. 1-4; Mimic Technologies Inc.
Bernstein et al.; "Sniper bullet detection by millimeter-wave radar"; Proc. SPIE 3577, Sensors, C31, Information and Training Technologies for Law Enforcement, 231; Jan. 7, 1999; pp. 1-3; located at: http://proceedings.spiedigitallibrary.org/proceeding.aspx?articleid=974277.
Brown et al.; "Ku-Band Retrodirective Radar for Ballistic Projectile Detection and Tracking"; Radar Conference 2009; May 4-8, 2009; pp. 1-4; IEEE.
Brown, Elayne; "Retrodirective Noise Correlating Radar: Fast Detection of Small Projectiles Plus Imaging of the Scene"; SBIR—STTR: America's Seed Fund; Bearing a date of 2006, Created on Nov. 4, 2015; pp. 1-2; located at: https://www.sbir.gov/sbirsearch/detail/271231.
Harmer et al.; "Radar Identification of Hostile Fire by Means of the Electromagnetic Complex Natural Resonances of Projectiles"; Progress in Electromagnetics Research M; Apr. 21, 2012; pp. 167-178; vol. 24.
Hommes et al.; "A fast tracking 60 GHz Radar using a frequency scanning antenna"; Infrared, Millimeter, and Terahertz waves (IRMMW-THz), 2014 39th International Conference; Sep. 14-19, 2014; pp. 1-2; IEEE.
Li et al; "Real-Time Tracking of Bullet Trajectory Based on Chirp Transform in a Multi-Sensor Multi-Frequency Radar"; Radar Conference, 2010 IEEE; May 10-14, 2010; pp. 1203-1207; IEEE.
Pinezich et al.; "A Ballistic Projectile Tracking System Using Continuous Wave Doppler Radar"; Created on Nov. 4, 2015; 7 Total pages.
"SPiDR Hostile Fire Radar delivers stealthy, speed-of-light detection of incoming fire"; Syntonics; Bearing a date of 2015, Created on Nov. 4, 2015; p. 1; located at: http://www.syntonicscorp.com/rd-spidr.html.
"Best Practices for Use of Vibration Feedback in Video Console Games"; Immersion Corporation; Bearing a date of 2010, Created on Nov. 5, 2015; Total of 24 pages.
Buswell et al.; "The Bat Hat: Ultrasonic range-finder with haptic feedback"; Cornell University : Electrical & Computer Engineering—Final Project; Bearing a date of 2013, Created on Nov. 5, 2015; Total of 19 pages.
Cassinelli et al.; "Augmenting spatial awareness with Haptic Radar"; Wearable Computers, 2006 10th IEEE International Symposium; Oct. 11-14, 2006; Total of 4 pages; IEEE.
Eaton, Kit; "Intendix: Computer Thought-Control Fantasy Made Real"; Fast Company; Bearing a date of Mar. 8, 2010; Total of 8 pages.
"Haptic Feedback device for the Visually Impaired [Project HALO]"; Instructables.com; Bearing a date of Dec. 3, 2014, Created on Nov. 5, 2015; 31 Total Pages; located at: www.instructables.com/id/Haptic-F_eedback-device-for-the-Visually-Impaired/.
"Marvel Heroes"; Marvelheroes.com; Bearing a date of Jul. 2013; Total of 12 pages; located at http://forums.marvelheroes.com/discussion/2403/spideysenses-that-should-be-in-game-what-do-you-think.
Mateevitsi et al.; "Sensing the environment through SpiderSense"; 4th Augmented Human International Conference (AH'13); Mar. 7-8, 2013; pp. 51-57.
"Tingling Electronic Spidey Sense Shirt"; Thinkgeek.com; Bearing a date of 2014, Created on Nov. 5, 2015; Total of 4 pages; located at: http://www.thinkgeek.com/product/f0b1/.
Wolf et al.; "Towards Supporting Situational Awareness using Tactile Feedback"; In Proceedings of the IEEE Symposium on 3D User Interfaces; Mar. 29-30, 2014; pp. 131-132.
PCT International Search Report; International App No. PCT/US2016/025587; dated Sep. 12, 2016; pp. 1-3.
"Jabra goes behind-the-neck with the Halo Smart Bluetooth headphones"; TechCrunch; bearing a date of Jun. 7, 2016; printed on Aug. 24, 2016; pp. 1-7; located at: https://techcrunch.com/2016/06/07/jabra-halo-smart/.

\* cited by examiner

```
        ┌───────┐
        │ Start │
        └───┬───┘
            ▼
┌─────────────────────────────────────────┐  ◁── 610
│ Acquiring data indicative of a trajectory│
│ of an incoming projectile.               │
└─────────────────┬───────────────────────┘
                  ▼
┌─────────────────────────────────────────┐  ◁── 620
│ Acquiring data indicative of a location  │
│ of a human present in a monitored        │
│ geographic area.                         │
└─────────────────┬───────────────────────┘
                  ▼
┌─────────────────────────────────────────┐  ◁── 630
│ Predicting a spatial relationship of the │
│ trajectory of the incoming projectile    │
│ relative to the location of the human.   │
└─────────────────┬───────────────────────┘
                  ▼
┌─────────────────────────────────────────┐  ◁── 640
│ Determining a suggested movement by the  │
│ human to evade the incoming projectile.  │
└─────────────────┬───────────────────────┘
                  ▼
┌─────────────────────────────────────────┐  ◁── 650
│ Transmitting the suggested movement to   │
│ evade the incoming projectile.           │
└─────────────────┬───────────────────────┘
                  ▼
              ┌───────┐
              │  End  │
              └───────┘
```

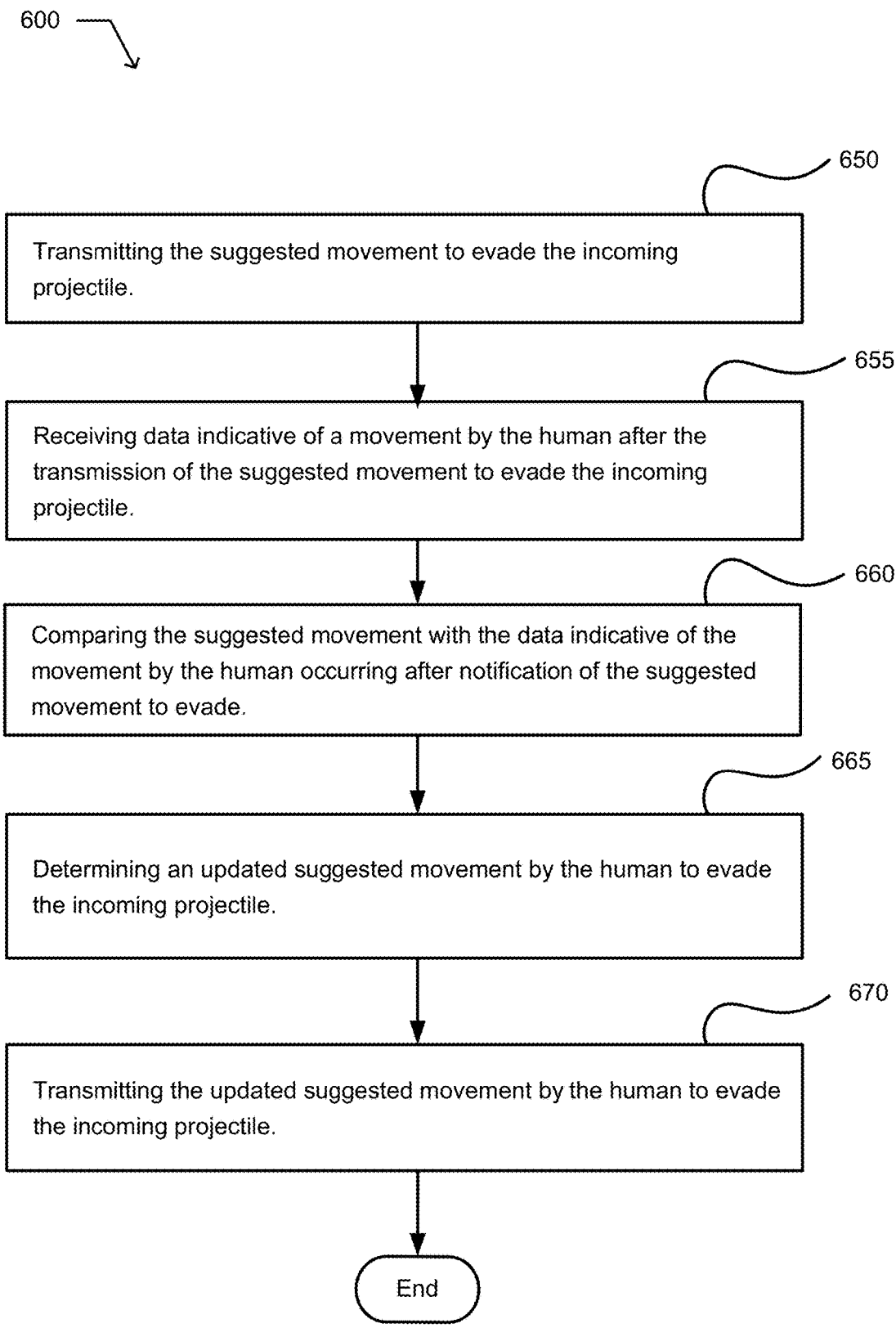

CENTRALIZED SYSTEM PROVING NOTIFICATION OF INCOMING PROJECTILES

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)).

Priority Applications

The present application constitutes a continuation-in-part of U.S. patent application Ser. No. 14/746,454, entitled FEEDBACK FOR ENHANCED SITUATIONAL AWARENESS, naming Ehren J. Bray, Alistair K. Chan, William David Duncan, Russell J. Hannigan, Roderick A. Hyde, Muriel Y. Ishikawa, 3ric Johanson, Jordin T. Kare, Tony S. Pan, Michael A. Schneider, Elizabeth A. Sweeney, Clarence T. Tegreene, Charles Whitmer, Lowell L. Wood Jr., Victoria Y. H. Wood as inventors, filed Jun. 22, 2015, which is currently co-pending or is an application of which a currently co-pending application is entitled to the benefit of the filing date of U.S. Provisional Patent Application No. 62/090,751, entitled HAPTIC FEEDBACK FOR ENHANCED SITUATIONAL AWARENESS, naming Russell J. Hannigan, Roderick A. Hyde, Muriel Y. Ishikawa, 3ric Johanson, Jordin T. Kare, Tony S. Pan, Clarence T. Tegreene, Charles Whitmer, Lowell L. Wood Jr., Victoria Y. H. Wood as inventors, filed Dec. 11, 2014.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

SUMMARY

For example, and without limitation, an embodiment of the subject matter described herein includes a real-time system. The system includes an incoming object sensor configured to acquire data indicative of a trajectory of an incoming projectile. The system includes a human tracking circuit configured to acquire data indicative of a location of a human present in a monitored geographic area. The system includes a processing circuit configured to (i) receive the data indicative of the trajectory of the incoming projectile; (ii) predict a spatial relationship of the trajectory of the incoming projectile relative to the location of the human; and (iii) determine a suggested movement by the human to evade the incoming projectile. The system includes a transmitter circuit configured to transmit the suggested movement to evade the incoming projectile.

For example, and without limitation, an embodiment of the subject matter described herein includes a method implemented in real-time. The method includes acquiring data indicative of a trajectory of an incoming projectile. The method includes acquiring data indicative of a location of a human present in a monitored geographic area. The method includes predicting a spatial relationship of the trajectory of the incoming projectile relative to the location of the human. The method includes determining a suggested movement by the human to evade the incoming projectile. The method includes transmitting the suggested movement to evade the incoming projectile.

In an embodiment, the method includes (i) receiving data indicative of a movement by the human after the transmission of the suggested movement to evade the incoming projectile; (ii) comparing the suggested movement with the data indicative of the movement by the human occurring after notification of the suggested movement to evade; (iii) determining an updated suggested movement by the human to evade the incoming projectile; and (iv) transmitting the updated suggested movement by the human to evade the incoming projectile.

For example, and without limitation, an embodiment of the subject matter described herein includes a real-time system. The system includes an incoming object sensor configured to acquire data indicative of a trajectory of an incoming projectile. The system includes a human tracking circuit configured to acquire data indicative of a respective location of each human of at least two humans present in a monitored geographic area. The system includes a processing circuit configured to (i) receive the data indicative of a trajectory of the incoming projectile; (ii) predict a spatial relationship of the trajectory of the incoming projectile relative to the respective location of each human of at least two humans; and (iii) determine a respective suggested movement by each human of the at least two humans to evade the trajectory of the incoming projectile. The system includes a transmitter circuit configured to transmit the respective suggested movement by each human of the at least two humans to evade the trajectory of the incoming projectile.

For example, and without limitation, an embodiment of the subject matter described herein includes a real-time system. The system includes a warning device configured to be worn by a human and to provide a notification to the human. The system includes a receiver circuit configured to receive a suggested movement by the human to evade an incoming projectile. The system includes a processing circuit configured to initiate in the warning device a notification of the received suggested movement by the human to evade the incoming projectile. In an embodiment, the system includes a head protection gear, and the warning device is coupled to the head protection gear.

For example, and without limitation, an embodiment of the subject matter described herein includes a real-time system. The system includes an incoming object sensor configured to acquire data indicative of a trajectory of a projectile incoming to a monitored geographical area. The system includes a processing circuit configured to predict a spatial relationship of the trajectory of the incoming projectile relative to the monitored geographical area. The system includes a transmitter circuit configured to transmit data indicative of the predicted spatial relationship of the trajectory of the incoming projectile relative to the monitored geographical area.

For example, and without limitation, an embodiment of the subject matter described herein includes a real-time system. The system includes a receiver circuit configured to receive data indicative of a predicted spatial relationship of a trajectory of an incoming projectile relative to a monitored geographical area. The system includes a warning device configured to be worn by the human and to provide a notification to the human. The system includes a processing circuit configured to (i) predict a spatial relationship of the trajectory of the incoming projectile relative to a human; and (ii) initiate a notification by the warning device suggesting a movement by the human to evade the incoming projectile.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 9 illustrates an example real-time operational flow 600;

FIG. 10 illustrates an alternative embodiment of the example real-time operational flow 600;

DETAILED DESCRIPTION

Figure 1:
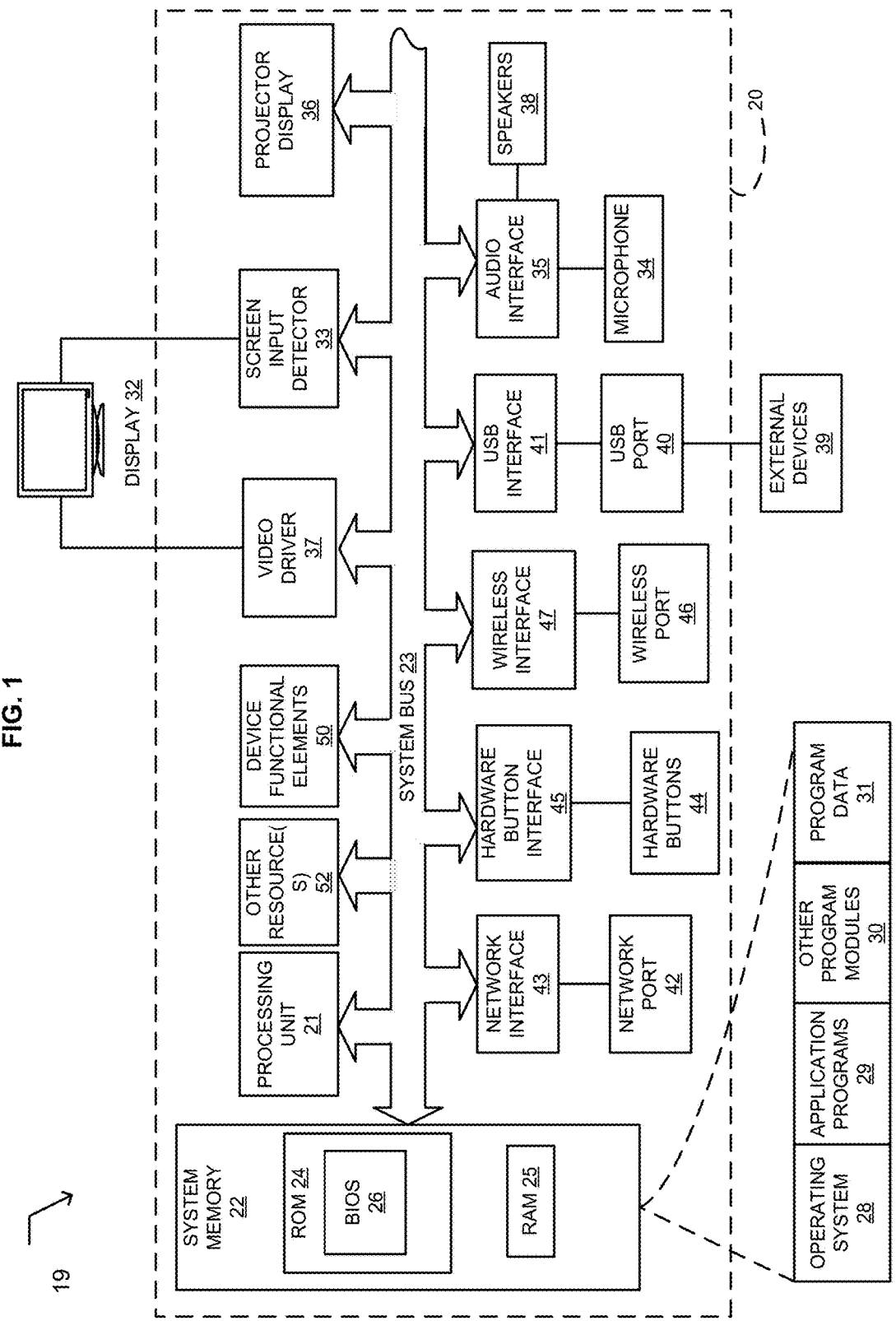
FIG. 1 illustrates an example embodiment of an environment 19 that includes a thin computing device 20 in which embodiments may be implemented.

This application makes reference to technologies described more fully in U.S. patent application Ser. No. 14/933,245, NOTIFICATION OF INCOMING PROJECTILES, naming Russell J. Hannigan et al. as inventors, filed on Nov. 5, 2015, is related to the present application. That application is incorporated by reference herein, including any subject matter included by reference in that application.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various implementations by which processes and/or systems and/or other technologies described herein can be effected (e.g., hardware, software, and/or firmware), and that the preferred implementation will vary with the context in which the processes and/or systems and/or other technologies are deployed. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Hence, there are several possible implementations by which the processes and/or devices and/or other technologies described herein may be effected, none of which is inherently superior to the other in that any implementation to be utilized is a choice dependent upon the context in which the implementation will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to implement an operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described below. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, module, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will also recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will further recognize that at least a portion of the devices and/or processes described herein can be integrated into an image processing system. A typical image processing system may generally include one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch-sensitive screen or display surface, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will likewise recognize that at least some of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch-sensitive screen or display surface, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Figure 2:
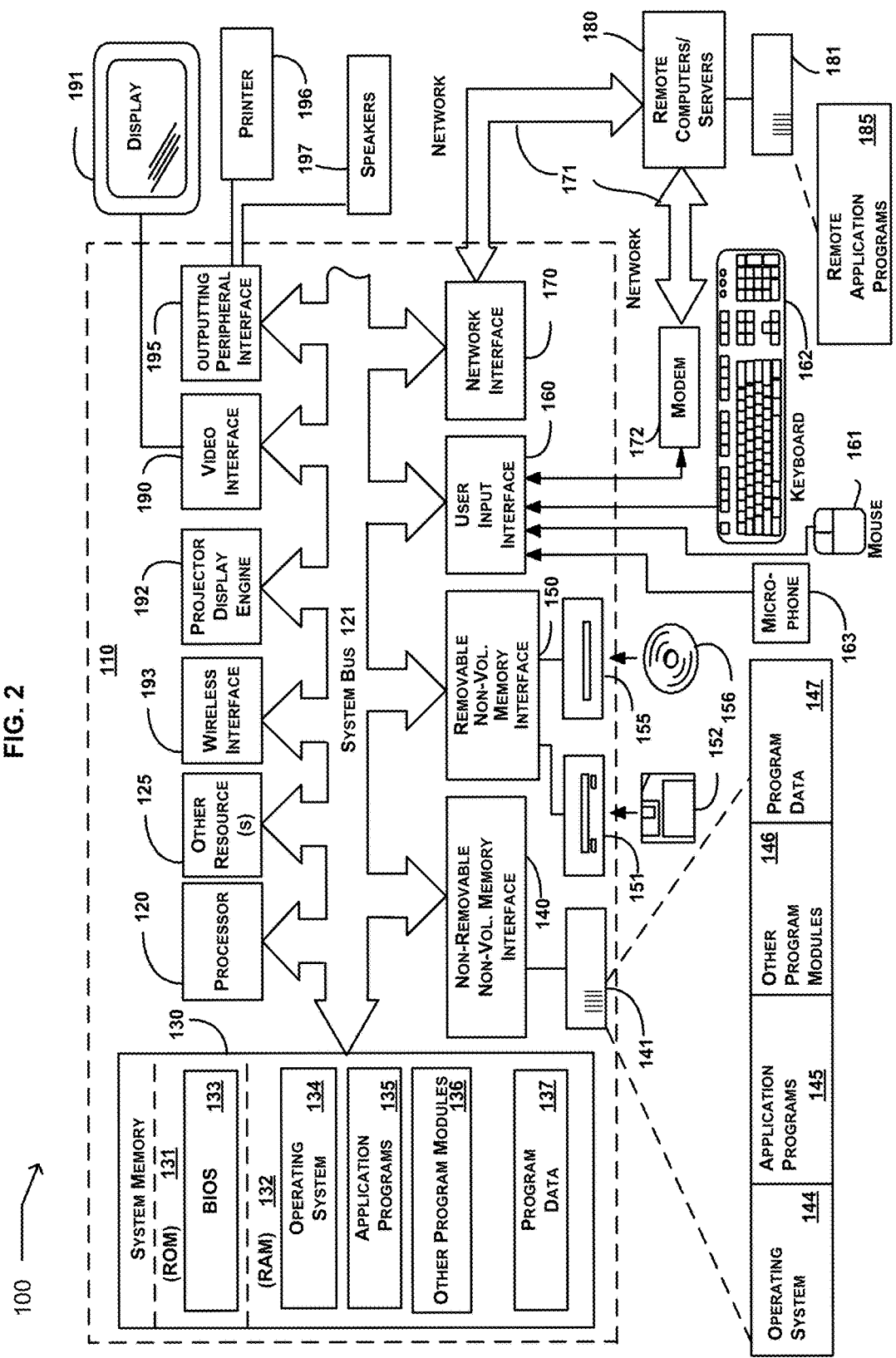
FIG. 2 illustrates an example embodiment of an environment 100 that includes a general-purpose computing system 110 in which embodiments may be implemented.

FIGS. 1 and 2 provide respective general descriptions of several environments in which implementations may be implemented. FIG. 1 is generally directed toward a thin computing environment 19 having a thin computing device 20, and FIG. 2 is generally directed toward a general purpose computing environment 100 having general purpose computing device 110. However, as prices of computer components drop and as capacity and speeds increase, there is not always a bright line between a thin computing device and a general purpose computing device. Further, there is a continuous stream of new ideas and applications for environments benefited by use of computing power. As a result, nothing should be construed to limit disclosed subject matter herein to a specific computing environment unless limited by express language.

FIG. 1 and the following discussion are intended to provide a brief, general description of a thin computing environment 19 in which embodiments may be implemented. FIG. 1 illustrates an example system that includes a thin computing device 20, which may be included or embedded in an electronic device that also includes a device functional element 50. For example, the electronic device may include any item having electrical or electronic components playing a role in a functionality of the item, such as for example, a refrigerator, a car, a digital image acquisition device, a camera, a cable modem, a printer an ultrasound device, an x-ray machine, a non-invasive imaging device, or an airplane. For example, the electronic device may include any item that interfaces with or controls a functional element of the item. In another example, the thin computing device may be included in an implantable medical apparatus or device. In a further example, the thin computing device may be operable to communicate with an implantable or implanted medical apparatus. For example, a thin computing device may include a computing device having limited resources or limited processing capability, such as a limited resource computing device, a wireless communication device, a mobile wireless communication device, a smart phone, an electronic pen, a handheld electronic writing device, a scanner, a cell phone, a smart phone (such as an Android® or iPhone® based device), a tablet device (such as an iPad®) or a Blackberry® device. For example, a thin computing device may include a thin client device or a mobile thin client device, such as a smart phone, tablet, notebook, or desktop hardware configured to function in a virtualized environment.

The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 or RAM 25, including an operating system 28, one or more application programs 29, other program modules 30 and program data 31.

A user may enter commands and information into the computing device 20 through one or more input interfaces. An input interface may include a touch-sensitive screen or display surface, or one or more switches or buttons with suitable input detection circuitry. A touch-sensitive screen or display surface is illustrated as a touch-sensitive display 32 and screen input detector 33. One or more switches or buttons are illustrated as hardware buttons 44 connected to the system via a hardware button interface 45. The output circuitry of the touch-sensitive display 32 is connected to the system bus 23 via a video driver 37. Other input devices may include a microphone 34 connected through a suitable audio interface 35, or a physical hardware keyboard (not shown). Output devices may include the display 32, or a projector display 36.

In addition to the display 32, the computing device 20 may include other peripheral output devices, such as at least one speaker 38. Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). It will be appreciated that the various components and connections shown are examples and other components and means of establishing communication links may be used.

The computing device 20 may be primarily designed to include a user interface. The user interface may include a character, a key-based, or another user data input via the touch sensitive display 32. The user interface may include using a stylus (not shown). Moreover, the user interface is not limited to an actual touch-sensitive panel arranged for directly receiving input, but may alternatively or in addition respond to another input device such as the microphone 34. For example, spoken words may be received at the microphone 34 and recognized. Alternatively, the computing device 20 may be designed to include a user interface having a physical keyboard (not shown).

The device functional elements 50 are typically application specific and related to a function of the electronic device, and are coupled with the system bus 23 through an interface (not shown). The functional elements may typically perform a single well-defined task with little or no user configuration or setup, such as a refrigerator keeping food cold, a cell phone connecting with an appropriate tower and transceiving voice or data information, a camera capturing and saving an image, or communicating with an implantable medical apparatus.

In certain instances, one or more elements of the thin computing device 20 may be deemed not necessary and omitted. In other instances, one or more other elements may be deemed necessary and added to the thin computing device.

FIG. 2 and the following discussion are intended to provide a brief, general description of an environment in which embodiments may be implemented. FIG. 2 illustrates an example embodiment of a general-purpose computing system in which embodiments may be implemented, shown as a computing system environment 100. Components of the computing system environment 100 may include, but are not limited to, a general purpose computing device 110 having a processor 120, a system memory 130, and a system bus 121 that couples various system components including the system memory to the processor 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media. By way of further example, and not of limitation, computer-readable media may include a communication media.

Computer storage media includes volatile and nonvolatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. In a further embodiment, a computer storage media may include a group of computer storage media devices. In another embodiment, a computer storage media may include an information store. In another embodiment, an information store may include a quantum memory, a photonic quantum memory, or atomic quantum memory. Combinations of any of the above may also be included within the scope of computer-readable media. Computer storage media is a non-transitory computer-readable media.

Communication media may typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media may include wired media, such as a wired network and a direct-wired connection, and wireless media such as acoustic, RF, optical, and infrared media. Communication media is a transitory computer-readable media.

The system memory 130 includes computer storage media in the form of volatile and nonvolatile memory such as ROM 131 and RAM 132. A RAM may include at least one of a DRAM, an EDO DRAM, a SDRAM, a RDRAM, a VRAM, or a DDR DRAM. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by the processor 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" ® are well known in the art.

The computing device 110 may also include other removable/non-removable, volatile/nonvolatile computer storage media products. By way of example only, FIG. 2 illustrates a non-removable non-volatile memory interface (hard disk interface) 140 that reads from and writes for example to non-removable, non-volatile magnetic media. FIG. 2 also illustrates a removable non-volatile memory interface 150 that, for example, is coupled to a magnetic disk drive 151 that reads from and writes to a removable, non-volatile magnetic disk 152, or is coupled to an optical disk drive 155 that reads from and writes to a removable, non-volatile optical disk 156, such as a CD ROM. Other removable/non-removable, volatile/non-volatile computer storage media that can be used in the example operating environment include, but are not limited to, magnetic tape cassettes, memory cards, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies.

A user may enter commands and information into the computing device 110 through input devices such as a microphone 163, keyboard 162, and pointing device 161, commonly referred to as a mouse, trackball, or touch pad. Other input devices (not shown) may include at least one of a touch-sensitive screen or display surface, joystick, game pad, satellite dish, and scanner. These and other input devices are often connected to the processor 120 through a user input interface 160 that is coupled to the system bus, but may be connected by other interface and bus structures, such as a parallel port, game port, or a universal serial bus (USB).

A display 191, such as a monitor or other type of display device or surface may be connected to the system bus 121 via an interface, such as a video interface 190. A projector display engine 192 that includes a projecting element may be coupled to the system bus. In addition to the display, the computing device 110 may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The network logical connections depicted in FIG. 2 include a local area network (LAN) and a wide area network (WAN), and may also include other networks such as a personal area network (PAN) (not shown). Such networking environments are commonplace in offices, enterprise-wide computer networks, intranets, and the Internet.

When used in a networking environment, the computing system environment 100 is connected to the network 171 through a network interface, such as the network interface 170, the modem 172, or the wireless interface 193. The network may include a LAN network environment, or a WAN network environment, such as the Internet. In a networked environment, program modules depicted relative to the computing device 110, or portions thereof, may be stored in a remote memory storage device. By way of example, and not limitation, FIG. 2 illustrates remote application programs 185 as residing on memory storage device 181. It will be appreciated that the network connections shown are examples and other means of establishing a communication link between the computers may be used.

In certain instances, one or more elements of the computing device 110 may be deemed not necessary and omitted. In other instances, one or more other elements may be deemed necessary and added to the computing device.

Figure 3:
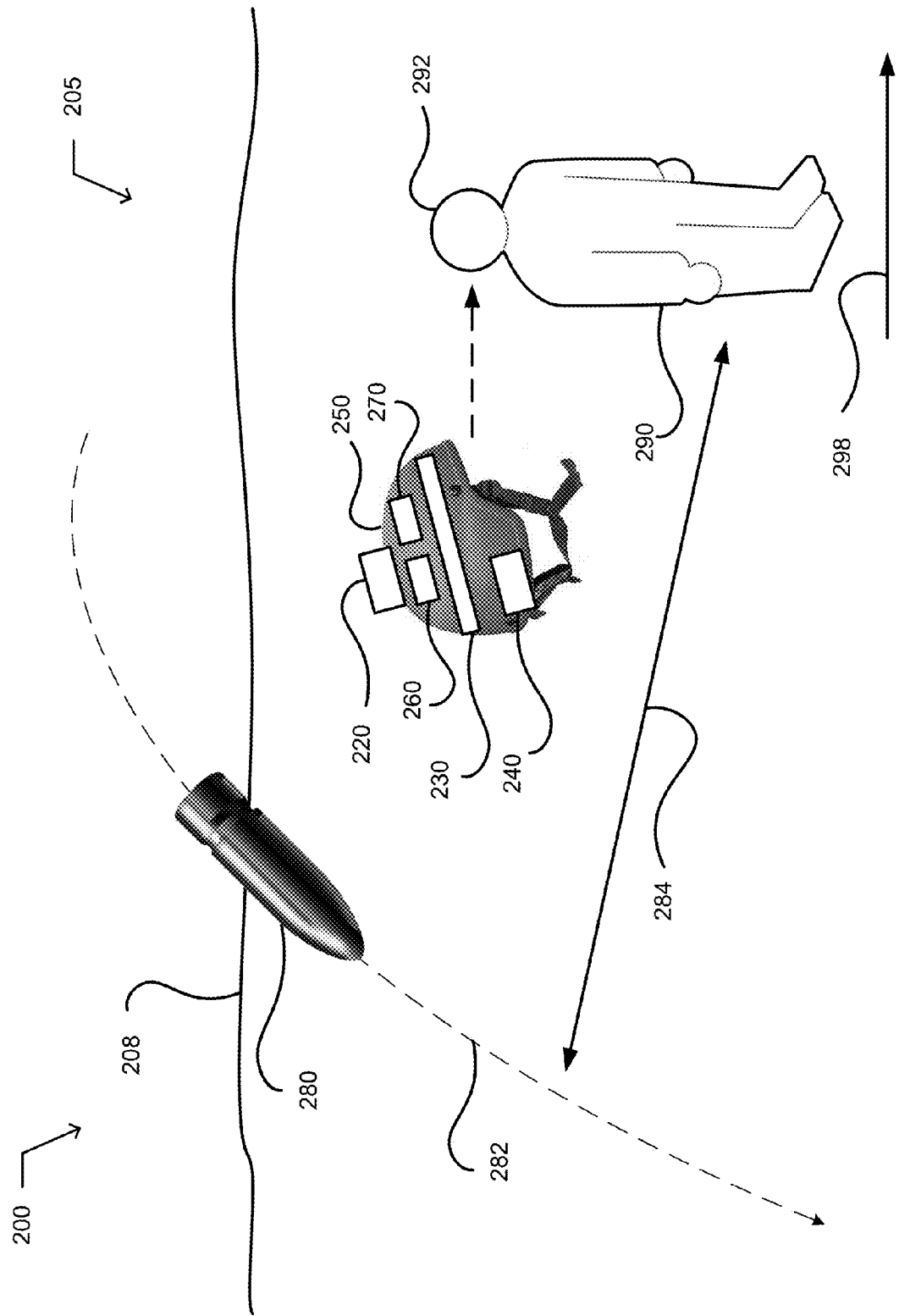
FIG. 3 illustrates an environment 200 that includes a real-time system 205.

FIG. 3 illustrates an environment 200 that includes a horizon 208, a human 290, and a real-time system 205. The system includes an incoming object sensor 220 configured to be worn by the human and to acquire data indicative of a trajectory 282 of an incoming projectile 280. The system includes a warning device 230 configured to be worn by the human and to provide a notification to the human. The system includes a processing circuit 240. The processing circuit is configured to receive the data indicative of a trajectory of the incoming projectile. The processing circuit is configured to predict a spatial relationship 284 of the trajectory of the incoming projectile relative to the human. The processing circuit is configured to initiate a notification by the warning device suggesting a movement 298 by the human to evade the incoming projectile. For example, the suggested movement may include a suggested movement to dodge the incoming projectile. In an embodiment, the processing circuit is configured to be worn or carried by the human. While FIG. 3 illustrates the incoming object sensor, the warning device, and the processing circuit being carried by or incorporated in a head protection gear 250, any or all of these three elements may be directly carried by or worn by the human.

In an embodiment, the real-time system 205 includes a level of responsiveness that enables the system to keep up with the flight of the incoming projectile 280 and initiate a notification to the human 290 before the incoming projectile hits or passes the human. In an embodiment, real-time is almost immediately. In an embodiment, real-time includes within the same timeframe as the flight time of the incoming projectile. In an embodiment, real-time defined by the situation at hand and pertains to the timeliness of the notification by the warning device. In an embodiment, real-time implies there are no significant delays. In an embodiment, real-time includes near real-time, which includes effectively real-time but with no guarantees of specific deadlines, e.g., no predictive latency.

In an embodiment of the real-time system 205, the incoming projectile 280 includes a ballistic projectile or a propelled projectile. For example, a shell, mortar, bullet, RPG, or air-to-ground missile. In an embodiment, the incoming object sensor 220 is configured to be carried by the head 292 of the human 290. In an embodiment, the incoming object sensor is configured to be carried by an appendage of the human. In an embodiment, the incoming object sensor is configured to be carried by the torso of the human. In an embodiment, the incoming object sensor includes a passive sensor or an active sensor. In an embodiment, the incoming object sensor includes at least two sensors. In an embodiment, the incoming object sensor includes at least one of an imaging system, a LIDAR system, a sonar system, or a radar system. In an embodiment, the incoming object sensor includes an optical sensor, an infrared sensor, an audio sensor, or a millimeter radar sensor. For example, an infrared sensor may be configured to sense heat generated by air friction and emitted by the incoming object. For example, an audio sensor may be configured to sense sound waves generated by the incoming projectile passing through air. In an embodiment, the incoming object sensor includes a multi-frequency radar sensor. In an embodiment, the incoming object sensor includes a Doppler radar sensor.

In an embodiment, the incoming object sensor 220 is configured to acquire data indicative of a closest approach to the human by the trajectory of the incoming projectile. In an embodiment, the incoming object sensor is configured to acquire data indicative of a closest approach to the human by the trajectory of the incoming projectile and a bearing or direction between the closest approach and the human. In an embodiment, the incoming object sensor is configured to acquire data indicative of a closest approach to the human by the trajectory of the incoming projectile and a distance from the closest approach to the human. In an embodiment, the incoming object sensor is configured to acquire data indicative of a closest approach to the human by the trajectory of the incoming projectile and a time of the closest approach to the human. In an embodiment, the incoming object sensor is configured to acquire data indicative of a trajectory of an incoming projectile and a location of a ground impact by the incoming projectile. In an embodiment, the incoming object sensor is configured to acquire data indicative of a trajectory of an incoming projectile, a location of a ground impact by the incoming projectile, and a bearing between the location of the ground impact to the human. In an embodiment, the incoming object sensor is configured to acquire data indicative of a trajectory of an incoming projectile, a location of a ground impact by the incoming projectile, and a distance between the location of the ground impact to the human. In an embodiment, the system 205 includes a head protection gear 250, and the incoming object sensor 220 is coupled to the head protection gear. In an embodiment, the head protection gear includes a combat helmet.

In an embodiment of the real-time system 205, the warning device 230 is configured to be carried by the head 292 of the human 290. In an embodiment, the warning device is configured to be worn on an appendage of the human. For example, the warning device may include an arm band, waist band, or wrist band. In an embodiment, the warning device includes a haptic element configured to generate a stimulus tactilely perceivable by a human. In an embodiment, the haptic element includes a vibratory element. In an embodiment, the warning device includes a speaker. In an embodiment, the speaker includes a pair of stereophonic speakers configured to output a stereophonic notification. In an embodiment, the warning device includes a vibratory element. In an embodiment, the warning device includes a vibratory element and a speaker. In an embodiment, the warning device includes a plurality of warning modules. In an embodiment, the plurality of warning modules include a plurality of spaced apart modules. In an embodiment, the plurality of warning modules are configured to encircle at least a portion of a perimeter of the head of the human. In an embodiment, each warning module of the plurality of warning modules is configured to selectively output the notification responsive to the predicted spatial relationship of the incoming projectile relative to the human. In an embodiment, the processing circuit 240 is configured to selectively initiate at least one warning module of the plurality of warning modules to output a notification of a suggested evasive movement 298 of the human away from the trajectory 282 of the incoming projectile 280.

In an embodiment, the real-time system 205 includes the head protection gear 250, and the warning device 230 is coupled to the head protection gear. In an embodiment, the head protection gear includes a combat helmet. In an embodiment, the warning device includes a plurality of warning modules coupled to the head protection gear. In an embodiment, the warning device includes a plurality of spaced apart warning modules located within an interior portion of the head protection gear.

In an embodiment of the real-time system 205, the processing circuit 240 is further configured to predict a proximity 284 and spatial relationship of the incoming projectile 280 relative to the human 290. In an embodiment, the processing circuit is configured to predict a closest approach to the human by the incoming projectile. In an embodiment, the processing circuit is configured to predict a closest approach to the human by the incoming projectile and a bearing or direction between the closest approach and the human. In an embodiment, the processing circuit is configured to predict a closest approach to the human by the incoming projectile and a distance from the closest approach to the human. In an embodiment, the processing circuit is configured to predict a closest approach to the human by the incoming projectile and a time of the closest approach to the human. In an embodiment, the processing circuit is configured to predict a trajectory of an incoming projectile and a location of a ground impact by the incoming projectile. In an embodiment, the processing circuit is configured to predict a trajectory of an incoming projectile, a location of a ground impact by the incoming projectile, and a bearing between the location of the ground impact to the human. In an embodiment, the processing circuit is configured to predict a trajectory of an incoming projectile, a location of a ground impact by the incoming projectile, and a distance between the location of the ground impact to the human. In an embodiment, the processing circuit is configured to predict a temporal relationship of the trajectory of the incoming projectile relative to the human.

In an embodiment of the real-time system 205, the notification by the warning device 230 includes a suggested movement 298 of the human 290 away from the trajectory 282 of the incoming projectile 280. In an embodiment, the notification by the warning device includes an indication of a direction of the incoming projectile. For example, the indication of a direction of the incoming projectile can be delivered by vibration of a headband, helmet/liner, armband, or the like. For example, the indication of a direction of the incoming projectile can be delivered by activation of two nearest sources straddling the actual direction. For example, the indication of a direction of the incoming projectile can be delivered by activation of source at the proper direction. For example, the indication of a direction of the incoming projectile can be indicated relative to current head or body orientation. In an embodiment, the notification by the warning device includes a generalized notification of the incoming projectile. For example, a generalized notification may include non-directional information (e.g., distance of impact or closest-approach). For example, the non-directional information may be indicated by an amplitude of vibration, by a frequency of vibration, by overtones or a frequency spread, by pulse format, or the like. In an embodiment, the notification by the warning device includes a predicted time until a closest approach or impact by the incoming object. For example, the impact may include a ground impact or a human impact. In an embodiment, the notification by the warning device includes an indication of a velocity of the incoming object. In an embodiment, the notification by the warning device is responsive to a proximity of the warning device to a direction from the trajectory of the incoming object to the human. For example, the warning device may be activated on the same side of the human as the trajectory. For example, the warning device may be activated on the opposite side of the human as the trajectory. In an embodiment, the notification by the warning device is responsive to a location of the warning device relative to a suggested evasive movement. In an embodiment, the suggested movement is away from the location of the warning device. In an embodiment, the notification by the warning device includes a haptic output. In an embodiment, a haptic output includes a tactile touch contacting the skin of the human, or force feedback contacting the skin of the human. In an embodiment, the notification by the warning device includes a haptic output suggesting a movement by the human to evade the incoming projectile. In an embodiment, an aspect of the haptic output includes a tactile touch to the human that is indicative of a parameter of the incoming object. For example, a parameter of the incoming object may include a velocity of the incoming object, a predicted time until a predicted impact with the incoming object, or a predicted distance of the trajectory from the human. In an embodiment, an aspect of the haptic output includes a force contacting the human that is indicative of a parameter of the incoming object. In an embodiment, the notification by the warning device includes a vibratory output. In an embodiment, the vibratory output includes a suggested movement by the human to evade the incoming projectile. In an embodiment, a frequency or pitch of the vibratory output is responsive to a parameter of the incoming object. In an embodiment, an amplitude of the vibratory output is responsive to a parameter of the incoming object. In an embodiment, the notification by the warning device includes an audible output. In an embodiment, the notification by the warning device includes an audible output suggesting a movement by the human to evade the incoming projectile. In an embodiment, a frequency or pitch of the audible output is responsive to a parameter of the incoming object. In an embodiment, an amplitude of the audible output is responsive to a parameter of the incoming object. In an embodiment, the notification by the warning device includes a visual output. In an embodiment, the visual output includes a visual notification suggesting a movement by the human to evade the incoming projectile. In an embodiment, the notification by the warning device includes a notification of the incoming projectile and a suggested movement by the human to evade the incoming projectile. In an embodiment, the notification by the warning device includes a suggested movement by the human to evade the incoming projectile in advance of a predicted impact of the incoming projectile on the human or the ground. In an embodiment, the notification by the warning device includes a suggested movement by the human to evade a future incoming projectile responsive to the predicted spatial relationship of the trajectory of the incoming projectile relative to the human. For example, such a notification may be delivered after passage of the incoming projectile. For example, a notification may report direction of closest approach, and may report a distance of closest approach. For example, in situations with lots of bullets, a notification may be provided based on aggregate data from many rounds. In an embodiment, the notification by the warning device includes a notification of no-suggested movement by the human to evade the incoming projectile. For example, the suggested no-movement may be provided if the incoming projectile does not pose a danger to the human. In an embodiment, if the closest approach of the incoming projectile is beyond threshold, the system can remain quiet, or can issue a "no danger" or "no-movement" message.

In an embodiment, the processing circuit 240 compares a minimum distance 284 between the trajectory 282 of the incoming projectile 280 and the human 290 to a threshold, and provides the warning notification if the distance is less than the threshold. In an embodiment, the notification by the warning device 230 includes a suggested movement by the human to evade an incoming projectile on a round-by-round basis (e.g., for mortars and grenades, or for bullets) responsive to the predicted spatial relationship of the incoming projectile relative to the human. In an embodiment, the notification by the warning device includes a suggested movement by the human to evade an incoming projectile on an aggregate basis (e.g., for a burst of bullets) responsive to the predicted spatial relationship of the incoming projectile relative to the human.

In an embodiment, the real-time system 205 includes a body orientation sensor 260 configured to acquire data indicative of a current orientation of a body part of the human. In an embodiment, the orientation sensor includes a wearable sensor. For example, the orientation sensor may be configured to be worn on the head 292 of the human 290. For example, the orientation sensor may be configured to be worn on the same body part as the warning device 230. Body orientation sensor 260 may comprise one or more accelerometers, gyroscopes, inclinometers, magnetometers, light sensors, imagers (to determine orientation relative to celestial bodies, or to local buildings or terrain), RF antennas, or the like.

In an embodiment of the real-time system 205, the processing circuit 240 is further configured to (i) receive data indicative of a current orientation of a body part of the human 290; (ii) determine a current orientation of the body part of the human relative to the trajectory 282 of the incoming projectile 280; and (iii) initiate a notification by the warning device 230 suggesting a movement by the human to evade the incoming projectile that is responsive to the current orientation of the body part of the human.

In an embodiment of the real-time system 205, the notification by the warning device 230 further includes a notification responsive to a proximity parameter satisfying a predetermined threshold. For example, the proximity parameter may include the spatial relationship 284 of the trajectory 282 of the incoming projectile 280 to the human 290. In an embodiment, the proximity parameter includes a speed of the incoming projectile or a proximity of a predicted closest approach or impact location to the human. In an embodiment, the proximity parameter includes a user configurable proximity parameter.

In an embodiment, the real-time system 205 includes a movement sensor 270 configured to acquire data indicative of a movement by the human 290. For example, the movement sensor may include an accelerometer. In an embodiment of the real-time system, the processing circuit 240 is further configured to (i) receive data indicative of a movement by the human 290 after the notification of the suggested movement to evade the incoming projectile 280; (ii) compare the suggested movement with the data indicative of the movement by the human occurring after notification of the suggested movement to evade; (iii) determine an updated suggested movement by the human to evade the incoming projectile; and (iv) initiate a notification by the warning device of the updated suggested movement by the human to evade the incoming projectile. In an embodiment, the updated suggested movement includes suggesting the human avoid a movement towards a direction of closest approach or impact. In an embodiment, the updated suggested movement includes a modified parameter of the initial suggested movement by the human to evade the incoming projectile. For example, the modified parameter of the initial suggested movement may include an increase in amplitude, sound level, or frequency of the notification. For example, the modified parameter of the initial suggested movement may include employing a different notification mode, e.g. sound instead of haptic. In an embodiment, the processing circuit is further configured to electronically store the comparison of the suggested movement with the movement by the human occurring after the suggested movement to evade. The comparison may be used for post-action review by the human, a supervisor or superior officer of the human, or someone else. The post-action review may include a specific review of actions by the human. The post-action review may be used in an aggregate review of many incoming projectile incidents to better determine warning thresholds. The comparison may be stored locally by device carried by the human and downloaded later, or may be transmitted to an external device.

Figure 4:
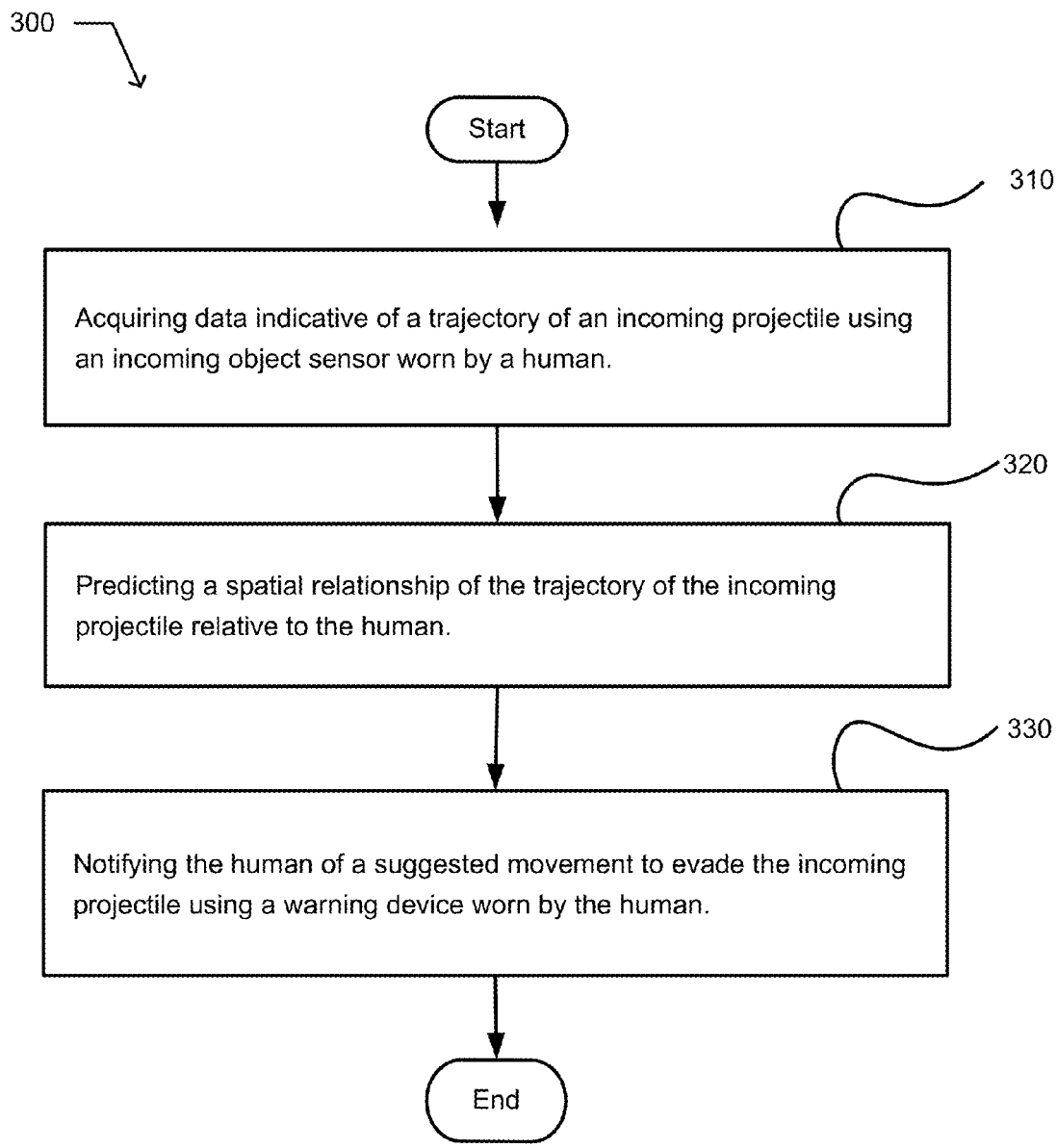
FIG. 4 illustrates an example operational flow 300 implemented in real-time.

FIG. 4 illustrates an example operational flow 300 implemented in real-time. After a start operation, the operational flow includes tracking operation 310. The tracking operation includes acquiring data indicative of a trajectory of an incoming projectile using an incoming object sensor worn by a human. In an embodiment, the tracking operation may be implemented using the incoming object sensor 220 described in conjunction with FIG. 3. A first analysis operation 320 includes predicting a spatial relationship of the trajectory of the incoming projectile relative to the human. In an embodiment, the first analysis operation includes predicting a spatial relationship of the trajectory of the incoming projectile relative to the human in response to the data indicative of a trajectory of the incoming projectile. In an embodiment, the first analysis operation may be implemented using the processing circuitry 240 described in conjunction with FIG. 3. A first alerting operation 330 includes notifying the human of a suggested movement to evade the incoming projectile using a warning device worn by the human. In an embodiment, the first alerting operation may be implemented using the warning device 230 described in conjunction with FIG. 3. The operational flow includes an end operation.

In an embodiment of the first analysis operation 320, the predicting includes predicting a proximity and spatial relationship of the incoming projectile relative to the human. In an embodiment of the analysis operation, the predicting includes predicting a closest approach to the human by the incoming projectile and a bearing between the closest approach and the human. In an embodiment of the analysis operation, the predicting includes predicting a trajectory of an incoming projectile and a location of a ground impact by the incoming projectile.

In an embodiment of the first alerting operation 330, the notifying includes notifying the human of a suggested movement away from the trajectory of the incoming projectile. In an embodiment of the first alerting operation, the notifying includes notifying the human of a suggested movement to evade the incoming projectile using a haptic warning device worn by the human.

Figure 5:
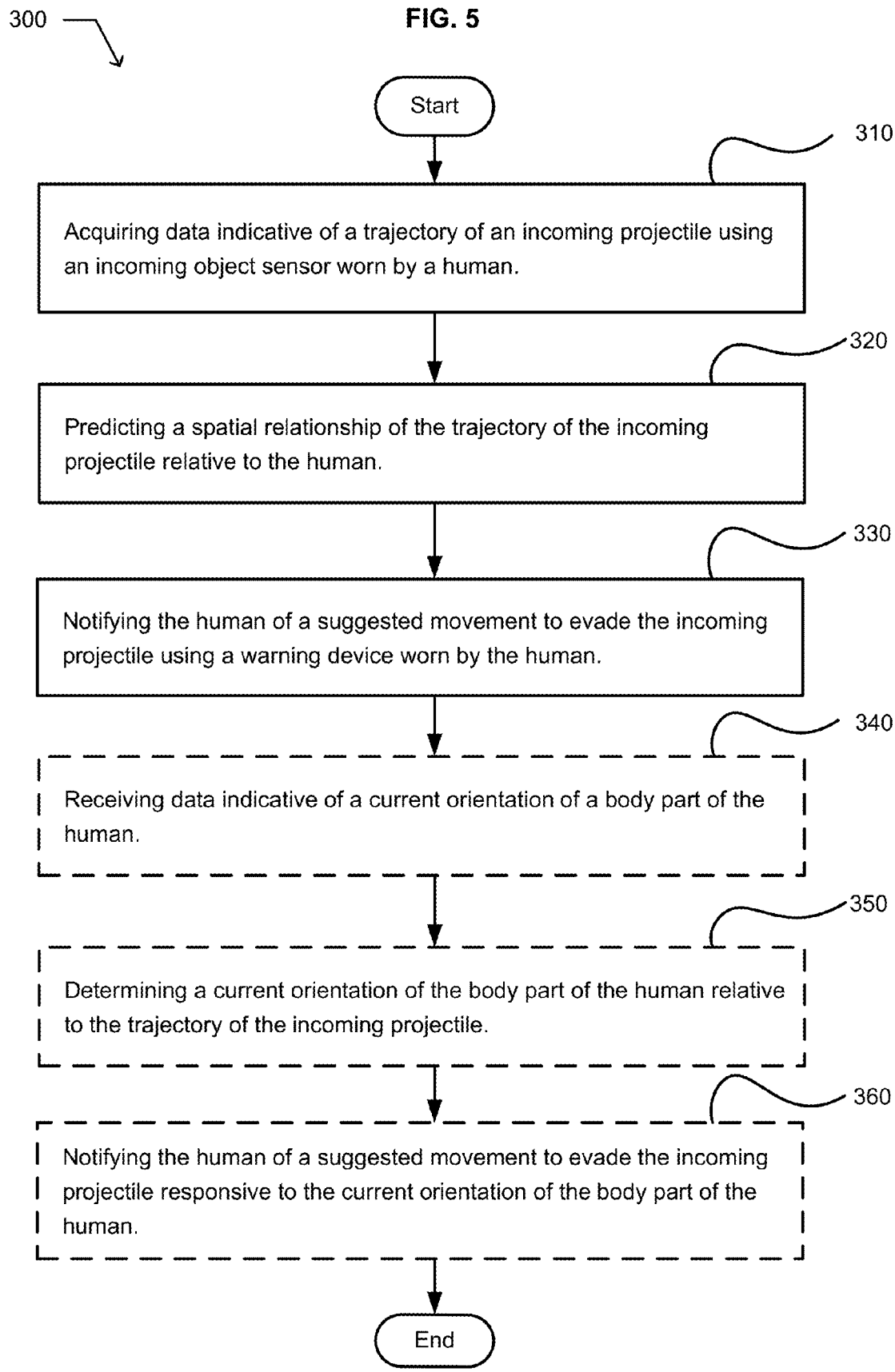
FIG. 5 illustrates an alternative embodiment of the operational flow 300.

FIG. 5 illustrates an alternative embodiment of the operational flow 300. The operation flow includes a reception operation 340 that includes receiving data indicative of a current orientation of a body part of the human. A second analysis operation 350 includes determining a current orientation of the body part of the human relative to the trajectory of the incoming projectile. A second alerting operation 360 includes notifying the human of a suggested movement to evade the incoming projectile responsive to the current orientation of the body part of the human. In an embodiment, the second alerting operation includes using the warning device to notify the human of a suggested movement to evade the incoming projectile.

Figure 6:
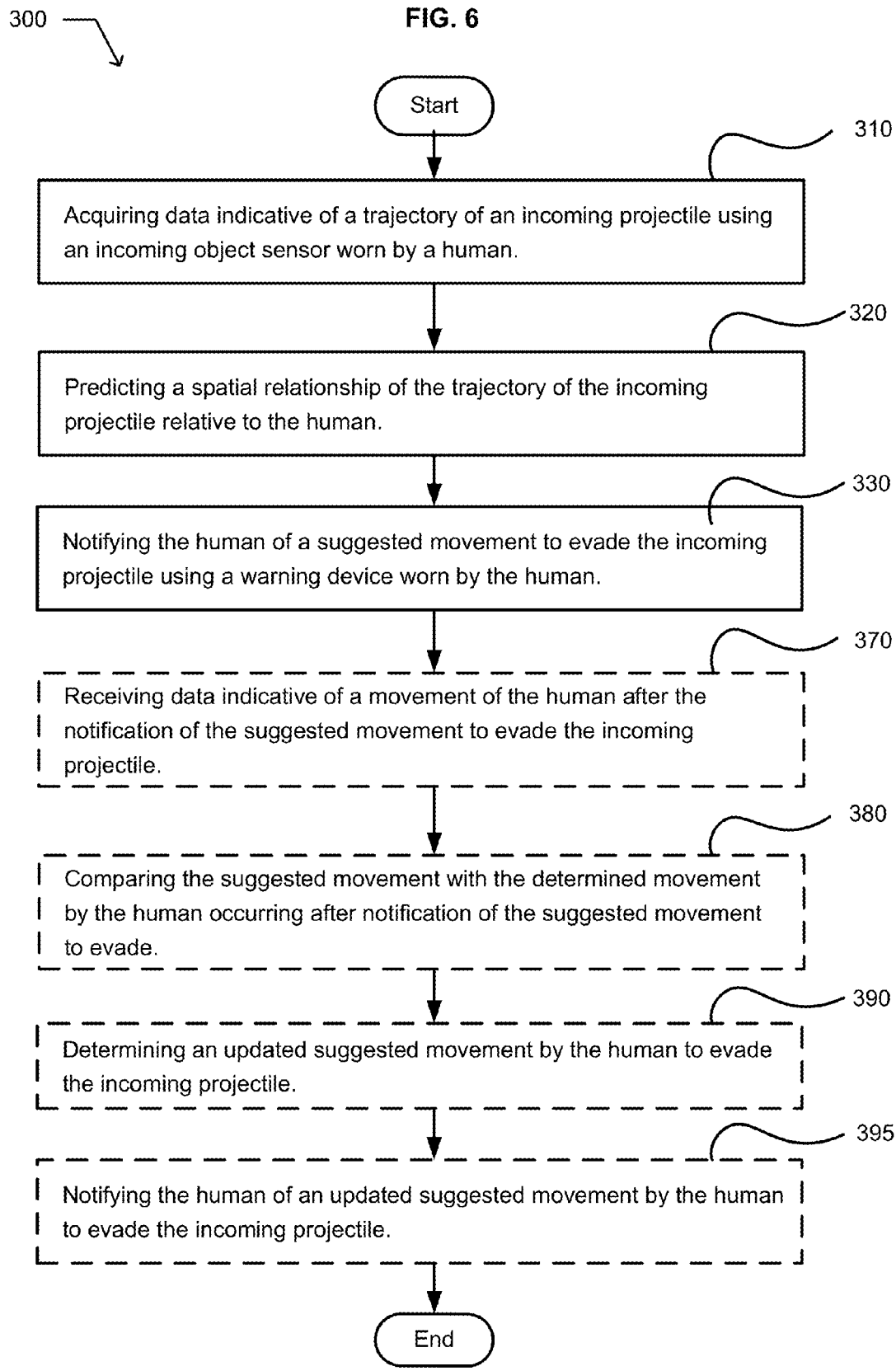
FIG. 6 illustrates another alternative embodiment of the operational flow 300.

FIG. 6 illustrates another alternative embodiment of the operational flow 300. The operation flow includes a reception operation 370 that includes a receiving data indicative of a movement of the human after the notification of the suggested movement to evade the incoming projectile. An evaluation operation 380 includes comparing the suggested movement with the determined movement by the human occurring after notification of the suggested movement to evade. In an embodiment, the evaluation operation may be implemented using the processing circuitry 240 described in conjunction with FIG. 3. A third analysis operation 390 includes determining an updated suggested movement by the human to evade the incoming projectile. A third alerting operation 395 includes notifying the human of an updated suggested movement by the human to evade the incoming projectile.

Figure 7:
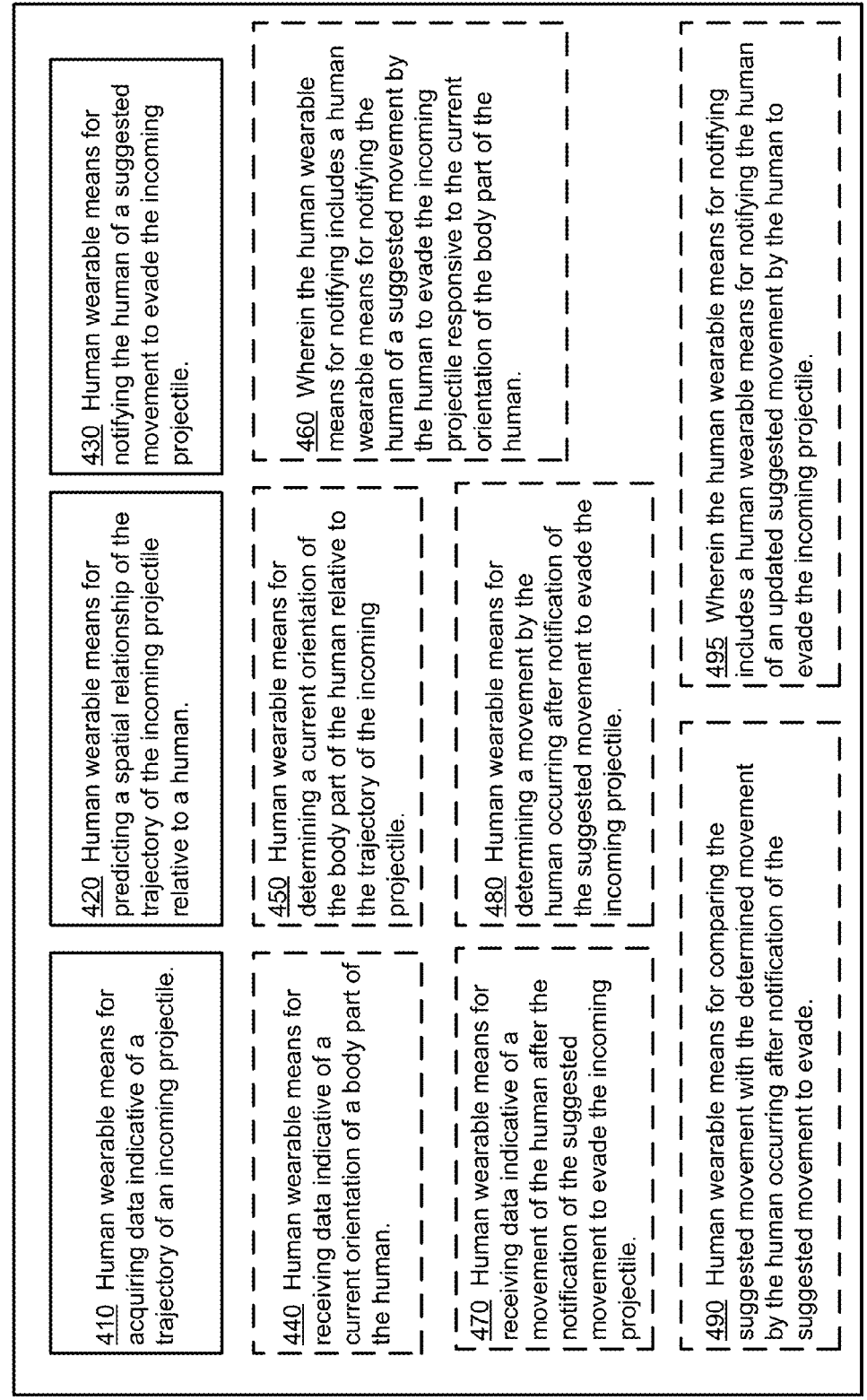
FIG. 7 illustrates an example real-time system 400.

FIG. 7 illustrates an example real-time system 400. The system includes a human wearable means 410 for acquiring data indicative of a trajectory of an incoming projectile. The system includes a human wearable means 420 for predicting a spatial relationship of the trajectory of the incoming projectile relative to a human. The system includes a human wearable means 430 for notifying the human of a suggested movement to evade the incoming projectile.

In an alternative embodiment, the real-time system 400 further includes a human wearable means 440 for receiving data indicative of a current orientation of a body part of the human. The system includes a human wearable means 450 for determining a current orientation of the body part of the human relative to the trajectory of the incoming projectile. In this alternative embodiment, the human wearable means 430 for notifying includes a human wearable means 460 for notifying the human of a suggested movement by the human to evade the incoming projectile responsive to the current orientation of the body part of the human.

In another alternative embodiment, the real-time system 400 further includes a human wearable means 470 for receiving data indicative of a movement of the human after the notification of the suggested movement to evade the incoming projectile. The system includes a human wearable means 480 for determining a movement by the human occurring after notification of the suggested movement to evade the incoming projectile. The system includes a human wearable means 490 for comparing the suggested movement with the determined movement by the human occurring after notification of the suggested movement to evade. In this alternative embodiment, the human wearable means 430 for notifying includes a human wearable means for notifying the human of an updated suggested movement by the human to evade the incoming projectile.

Figure 8:
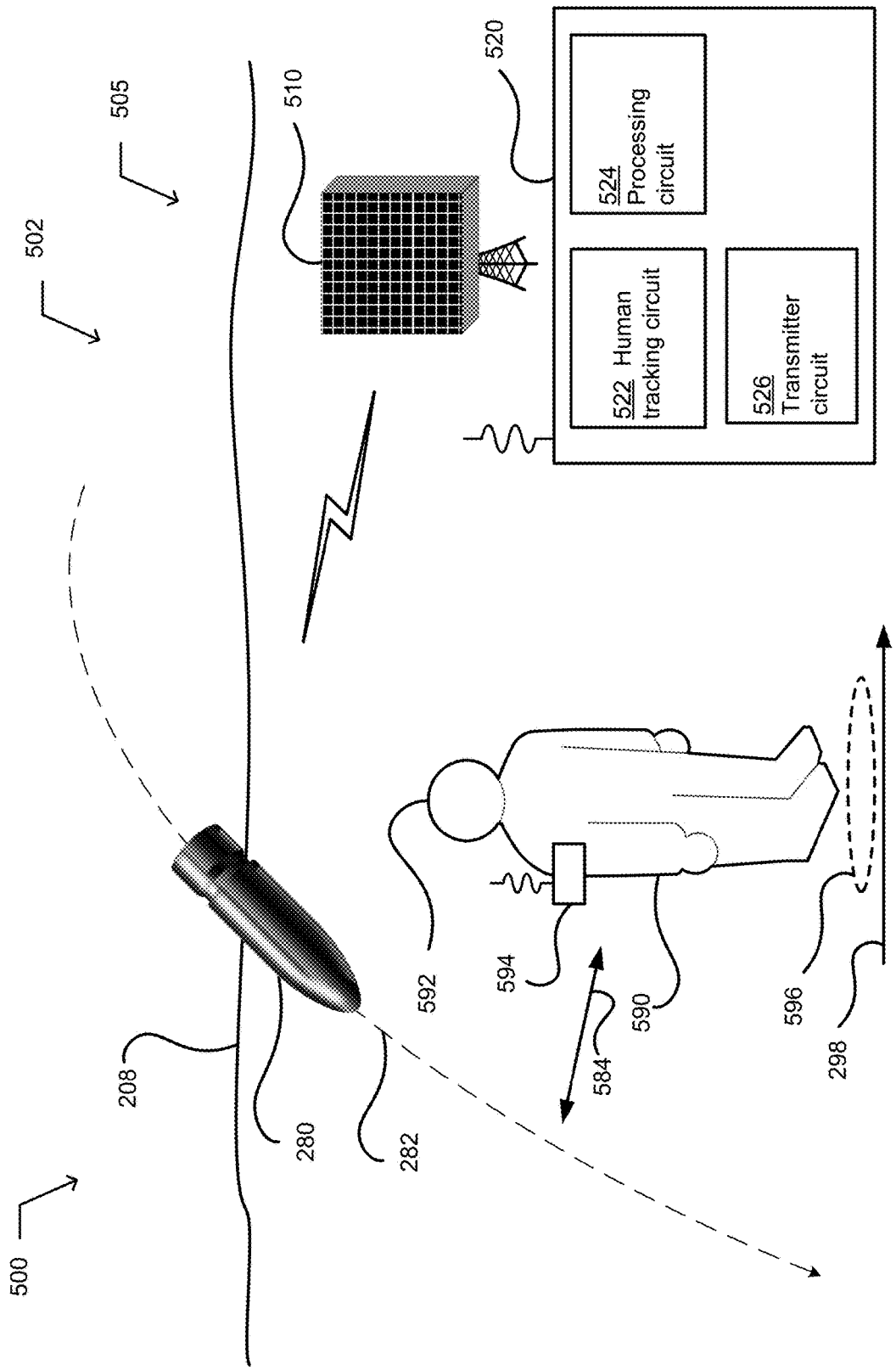
FIG. 8 illustrates an environment 500 that includes a real-time system 505.

FIG. 8 illustrates an environment 500 that includes the horizon 208, the human 590, and a real-time system 505. The system includes an incoming object sensor 510 configured to acquire data indicative of the trajectory 282 of the incoming projectile 280. The system includes electronic circuitry 520. The electronic circuitry includes a human tracking circuit 522 configured to acquire data indicative of a location 596 of a human 590 present in a monitored geographic area 502. The electronic circuitry includes a processing circuit 524. The processing circuit is configured to receive the data indicative of the trajectory of the incoming projectile. The processing circuit is configured to predict a spatial relationship 584 of the trajectory of the incoming projectile relative to the location of the human. The processing circuit is configured to determine a suggested movement by the human to evade the incoming projectile. The system includes a transmitter circuit 526 configured to transmit the suggested movement to evade the incoming projectile. In an embodiment, a transmitter circuit 526 configured to transmit the suggested movement to evade the incoming projectile to a receiver 594 carried by the human.

In an embodiment, the incoming object sensor 510 is configured to acquire data indicative of a trajectory 282 of an incoming projectile 280 relative to the monitored geographical area 502. In an embodiment, the incoming object sensor includes an optical sensor, an infrared sensor, an audio sensor, or a radar sensor. In an embodiment, the incoming object sensor includes a fixed base incoming object sensor or mobile incoming object sensor. In an embodiment, the incoming object sensor includes a drone carried incoming object sensor. In an embodiment, the incoming object sensor includes a satellite based incoming object sensor.

In an embodiment, the human tracking circuit 522 is configured to acquire positioning data indicative of the location 596 of the human 590 present in the monitored geographic area 502. In an embodiment, the positioning data includes encrypted positioning data. In an embodiment, the positioning data includes global positioning system (GPS) data indicative of the location of the human present in the monitored geographic area. In an embodiment, the positioning data includes local positioning system data indicative of the location of the human present in the monitored geographic area. In an embodiment, the local positioning system data is generated in response to a signal transmitted by a device carried by the human. In an embodiment, the local positioning system data is generated in response to a transponder carried by the human. In an embodiment, the positioning data is transmitted from a device carried by the human.

In an embodiment, the processing circuit 524 is further configured to predict a proximity and spatial relationship 584 of the incoming projectile 280 relative to the human 590. In an embodiment, the processing circuit is further configured to predict a spatial relationship of a trajectory of a future incoming projectile relative to the human in response to the predicted spatial relationship of the trajectory of the incoming projectile relative to the human. In an embodiment, the processing circuit is further configured to determine a suggested movement 298 of the human away from the trajectory of the incoming projectile. In an embodiment, the processing circuit is further configured to determine a suggested no-movement by the human to evade the incoming projectile.

In an embodiment, the processing circuit 524 is further configured to (i) receive data indicative of a movement by the human 590 after the transmission of the suggested movement 298 to evade the incoming projectile 280; (ii) compare the suggested movement with the data indicative of the movement by the human occurring after notification of the suggested movement to evade; and (iii) determine an updated suggested movement by the human to evade the incoming projectile. In this embodiment the transmitter circuit 526 is configured to transmit the updated suggested movement by the human to evade the incoming projectile.

FIG. 9 illustrates an example real-time operational flow 600. After a start operation, the operational flow includes a projectile tracking operation 610. The projectile tracking operation includes acquiring data indicative of a trajectory of an incoming projectile. In an embodiment, the projectile tracking operation includes acquiring data indicative of a trajectory of an incoming projectile approaching the monitored geographical area. In an embodiment, the projectile tracking operation may be implemented by the incoming object sensor 510 described in conjunction with FIG. 8. A human tracking operation 620 includes acquiring data indicative of a location of a human present in a monitored geographic area. In an embodiment, the human tracking operation may be implemented by the human tracking circuit 522 described in conjunction with FIG. 8. A first analysis operation 630 includes predicting a spatial relationship of the trajectory of the incoming projectile relative to the location of the human. In an embodiment, the first analysis operation may be implemented by the processing circuit 524 described in conjunction with FIG. 10. A second analysis operation 640 includes determining a suggested movement by the human to evade the incoming projectile. In an embodiment, the second analysis operation may be implemented by the processing circuit 524 described in conjunction with FIG. 8. A communication operation 650 includes transmitting the suggested movement to evade the incoming projectile. In an embodiment, the communication operation may be implemented by the transmitter circuit 526 described in conjunction with FIG. 8. The operational flow includes an end operation.

FIG. 10 illustrates an alternative embodiment of the example real-time operational flow 600. After the communication operation 650, the operational flow includes a reception operation 655 receiving data indicative of a movement by the human after the transmission of the suggested movement to evade the incoming projectile. An evaluation operation 660 includes comparing the suggested movement with the data indicative of the movement by the human occurring after notification of the suggested movement to evade. An analysis operation 665 includes determining an updated suggested movement by the human to evade the incoming projectile. A communication operation 670 includes transmitting the updated suggested movement by the human to evade the incoming projectile.

Figure 11:
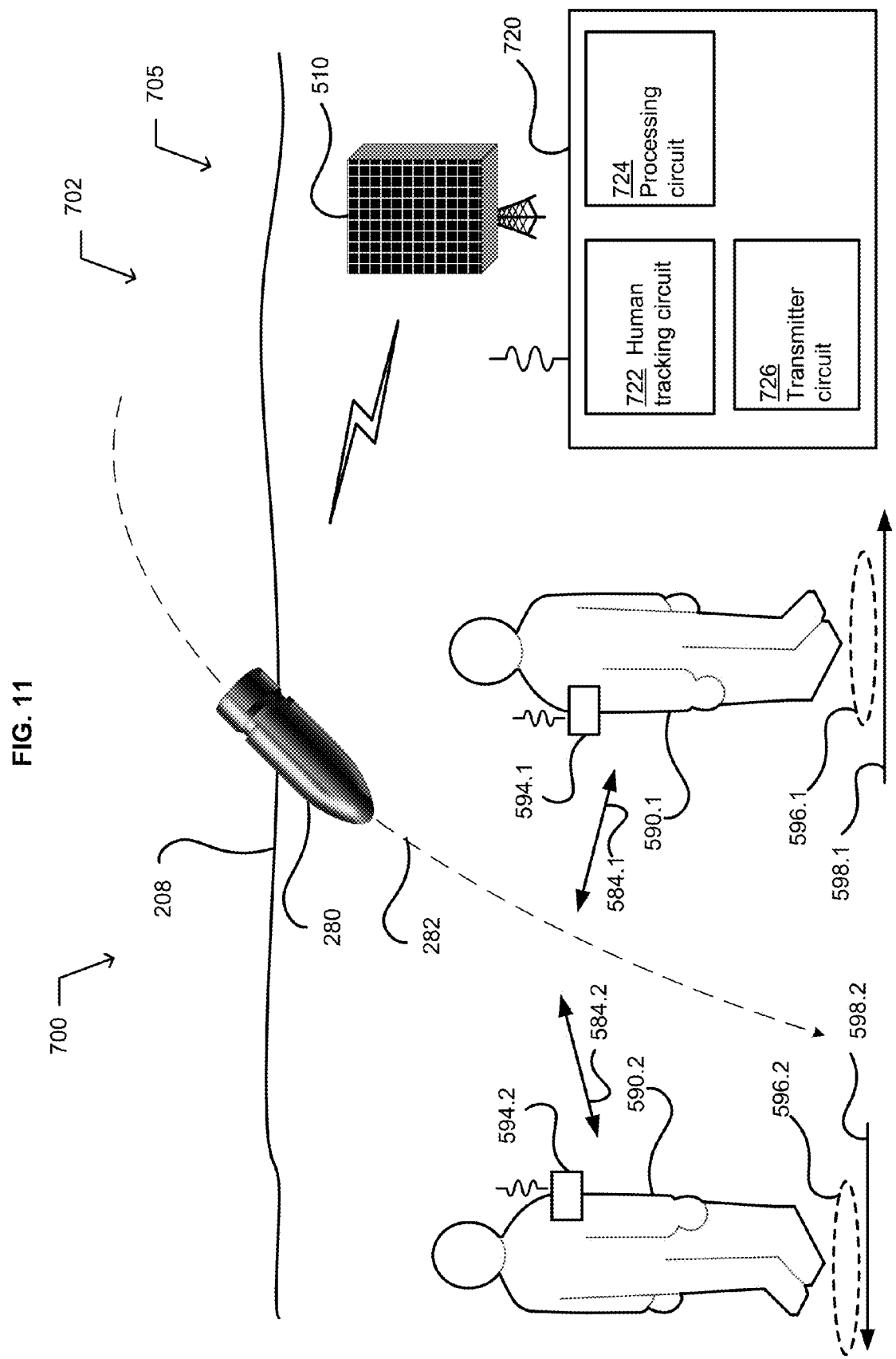
FIG. 11 illustrates an environment 700 that includes a real-time system 705.

FIG. 11 illustrates an environment 700 that includes the horizon 208, the humans 590.1 and 590.2, and a real-time system 705. The system includes an incoming object sensor 510 configured to acquire data indicative of the trajectory 282 of the incoming projectile 280. The system includes electronic circuitry 720. The electronic circuitry includes a human tracking circuit 722 configured to acquire data indicative of a respective location of each human of at least two humans present in a monitored geographic area 702. The at least two humans are illustrated by the human 590.1 at location 596.1 and the human 590.2 at location 596.2. The electronic circuitry includes a processing circuit 724. The processing circuit is configured to receive the data indicative of the trajectory of the incoming projectile. The processing circuit is configured to predict a spatial relationship of the trajectory of the incoming projectile relative to the respective location of each human of at least two humans, illustrated as the spatial relationship 584.1 and the spatial relationship 584.2. The processing circuit is configured to determine a respective suggested movement by each human of the at least two humans to evade the trajectory of the incoming projectile. For example, in an embodiment, the processing circuit is configured to determine a suggested movement 598.1 for human 590.1 to evade the trajectory of the incoming projectile and a suggested movement 598.2 for human 590.2 to evade the trajectory of the incoming projectile. The system includes a transmitter circuit 726 configured to transmit the respective suggested movement to evade the incoming projectile by each human of the at least two humans to evade the trajectory of the incoming projectile. In an embodiment, a transmitter circuit 726 configured to transmit the suggested movement to evade the incoming projectile to a receiver 594.1 carried by the human 590.1 and to a receiver 594.2 carried by the human 590.2.

Figure 12:
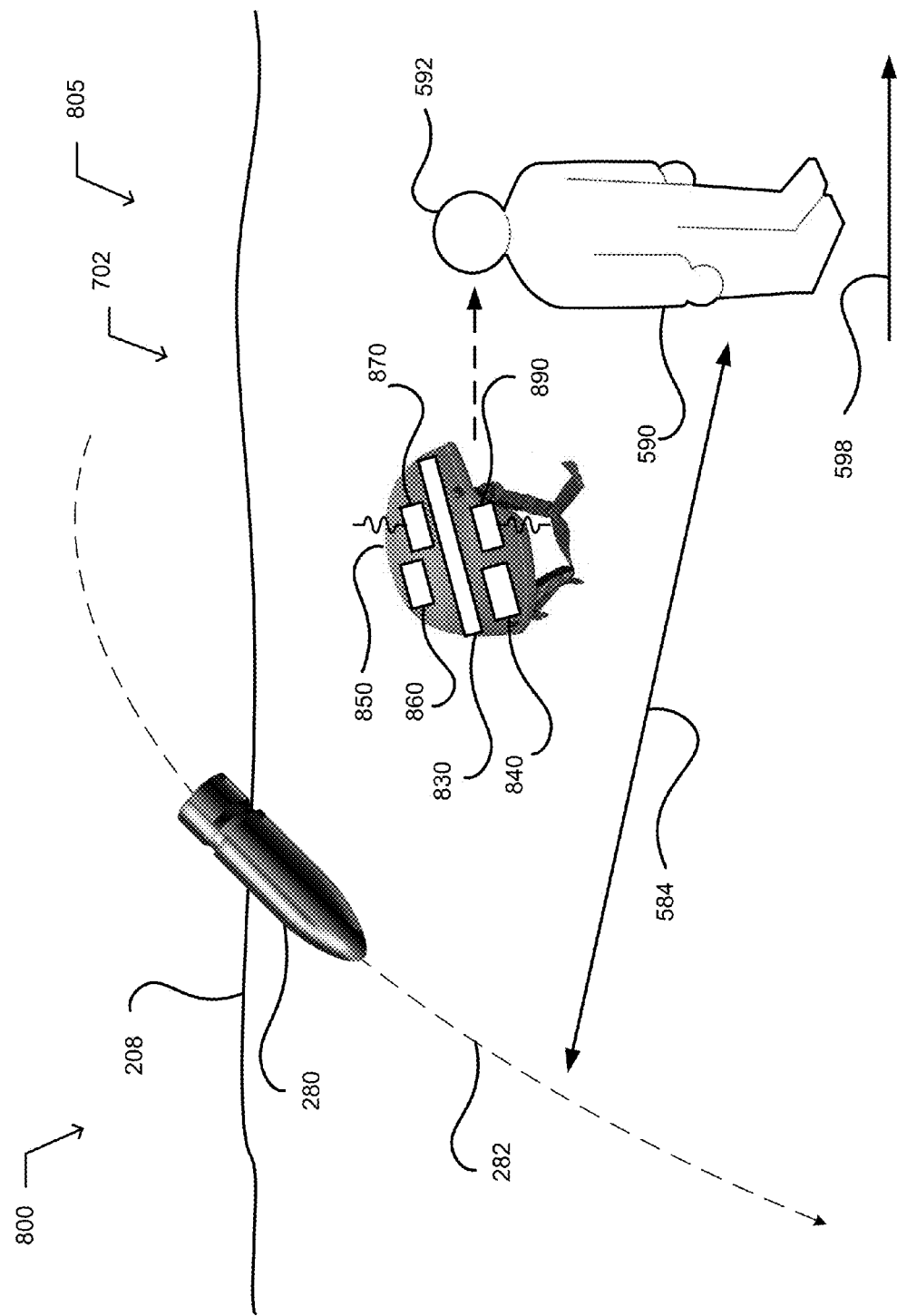
FIG. 12 illustrates an environment 800 that includes a real-time system 805.

FIG. 12 illustrates an environment 800 that includes the horizon 208, the human 590, and a real-time system 805. The system includes a warning device 830 configured to be worn by the human 590 and to provide a notification to the human. The system includes a receiver circuit 870 configured to receive a suggested movement 598 by the human to evade an incoming projectile 280.

In an embodiment, the real-time system 805 includes a processing circuit 840 configured to initiate in the warning device 830 a notification of the received suggested movement 598 by the human 590 to evade the incoming projectile 280. In an embodiment, the receiver circuit 870 is configured to be carried or worn by the human. In an embodiment, the warning device is configured to be worn on an appendage of the human, for example, such as the head 592 of the human, or a torso of the human. In an embodiment, the warning device includes a haptic element configured to generate a tactilely perceptive stimulus to the human. In an embodiment, the warning device includes a speaker. In an embodiment, the warning device includes a vibratory element. In an embodiment, the notification by the warning device includes a suggested movement 598 by the human away from the trajectory 282 of the incoming projectile.

In an embodiment, the real-time system 805 includes a head protection gear 850, and the warning device 830 is coupled to the head protection gear. In an embodiment, the real-time system 805 includes a body position sensor 860 configured to acquire data indicative of a current orientation of a body part of the human 590. In an embodiment, the processing circuit 840 is further configured to (i) receive the data indicative of a current orientation of a body part of the human; (ii) receive data indicative of a predicted spatial relationship 584 of the trajectory 282 of the incoming projectile 280 relative to the human; (iii) determine a current orientation of the body part of the human relative to the predicted spatial relationship of the trajectory of the incoming projectile; and (iii) initiate a notification by the warning device 830 suggesting a movement 598 by the human to evade the incoming projectile responsive to the current orientation of the body part of the human.

In an embodiment, the real-time system 805 includes a transmitter circuit 890 configured to transmit data indicative of a location of the human 590. In an embodiment, the transmitter circuit is configured to transmit data indicative of a location of the human within a monitored geographic area. In an embodiment, the transmitter circuit is configured to transmit global positioning system data indicative of the location of the human present in the monitored geographic area. In an embodiment, the transmitter circuit is configured to transmit a local positioning system data indicative of the location of the human present in the monitored geographic area. In an embodiment, the transmitter circuit includes a transponder configured to transmit data indicative of the location of the human present in the monitored geographic area. For example, the transponder may be configured to transmit data indicative of the location of the human present in the monitored geographic area in response to a query from a human tracking circuit. In an embodiment, the transmitter circuit is configured to be carried or worn by the human.

While FIG. 12 illustrates the warning device 830, the processing circuit 840, the body position sensor 860, the receiver circuit 870, and the transmitter circuit 890 carried by or incorporated in a combat helmet 850, any or all of these elements may be directly carried by or worn by the human.

In addition, FIG. 12 illustrates an alternative embodiment of the real-time system 805. The alternative embodiment of the system includes a receiver circuit 870 configured to receive data indicative of a predicted spatial relationship 584 of the trajectory 282 of the incoming projectile 280 relative to the monitored geographical area 702. The warning device 830 is configured to be worn by the human 590 and to provide a notification to the human. The processing circuit 840 is configured to (i) predict a spatial relationship of the trajectory of the incoming projectile relative to the human; and (ii) initiate a notification by the warning device suggesting a movement by the human to evade the incoming projectile.

In an embodiment, the alternative embodiment of the system 805 includes a location sensor configured to be worn by the human 590 and to determine data indicative to the location relative to the monitored geographical area. The location sensor can be configured to transmit (wirelessly or via direct wired connections) data indicative of a location of the human to processing circuit 840. In an embodiment, the processing circuit 840 is worn or carried by the human. For instance, in this embodiment, human worn portions of the system receive externally generated trajectory data, compare it to locally generated human location data and provide a warning notification to the human; without the location of the human being determined by, or transmitted to, an external system. In an embodiment, the receiver circuit 870 is configured to receive data indicative of a predicted spatial and temporal relationship of the trajectory 282 of incoming projectile 280 relative to the monitored geographical area 702. In an embodiment, the receiver circuit 870 is configured to receive data associated with the warning notification from the processing circuit. In an embodiment, the warning device 860 is configured to be carried by the head 592 of the human. In an embodiment, the warning device is configured to be worn on an appendage or torso of the human. In an embodiment, the warning device includes a haptic element configured to generate a stimulus tactilely perceivable by the human. In an embodiment, the system 805 includes a body part position sensor 860 configured to acquire data indicative of a current orientation of the body part of the human. In an embodiment, the processing circuit is further configured to (i) receive the data indicative of a current orientation of the body part of the human; (ii) determine a current orientation of the body part of the human relative to the predicted spatial relationship of the trajectory of the incoming projectile; and (iii) initiate a notification by the warning device suggesting a movement by the human to evade the incoming projectile responsive to the current orientation of the body part of the human.

All references cited herein are hereby incorporated by reference in their entirety or to the extent their subject matter is not otherwise inconsistent herewith.

In some embodiments, "configured" includes at least one of designed, set up, shaped, implemented, constructed, or adapted for at least one of a particular purpose, application, or function.

It will be understood that, in general, terms used herein, and especially in the appended claims, are generally intended as "open" terms. For example, the term "including" should be interpreted as "including but not limited to." For example, the term "having" should be interpreted as "having at least." For example, the term "has" should be interpreted as "having at least." For example, the term "includes" should be interpreted as "includes but is not limited to," etc. It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

In those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Use of "Start," "End," "Stop," or the like blocks in the block diagrams is not intended to indicate a limitation on the beginning or end of any operations or functions in the diagram. Such flowcharts or diagrams may be incorporated into other flowcharts or diagrams where additional functions are performed before or after the functions shown in the diagrams of this application. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A real-time system comprising:
   an incoming object sensor configured to acquire data indicative of a trajectory of a projectile incoming to a monitored geographic area;
   a human tracking circuit configured to acquire data indicative of a location of a human present in the monitored geographic area;
   a processing circuit configured to:
   receive the data indicative of the trajectory of the incoming projectile;
   predict a spatial relationship of the trajectory of the incoming projectile relative to the location of the human; and
   determine a suggested movement by the human to evade the incoming projectile; and
   a transmitter circuit configured to transmit the suggested movement by the human to evade the incoming projectile.

2. The system of claim 1, wherein the incoming object sensor is configured to acquire data indicative of a trajectory of an incoming projectile relative to the monitored geographical area.

3. The system of claim 1, wherein the incoming object sensor includes an optical sensor, an infrared sensor, an audio sensor, or a radar sensor.

4. The system of claim 1, wherein the incoming object sensor includes a fixed base incoming object sensor or mobile incoming object sensor.

5. The system of claim 1, wherein the incoming object sensor includes a drone carried incoming object sensor.

6. The system of claim 1, wherein the incoming object sensor includes a satellite based incoming object sensor.

7. The system of claim 1, wherein the human tracking circuit is configured to acquire positioning data indicative of the location of the human present in the monitored geographic area.

8. The system of claim 7, wherein the positioning data includes global positioning system (GPS) data indicative of the location of the human present in the monitored geographic area.

9. The system of claim 7, wherein the positioning data includes local positioning system data indicative of the location of the human present in the monitored geographic area.

10. The system of claim 7, wherein the positioning data is transmitted from a device carried by the human.

11. The system of claim 1, wherein the processing circuit is further configured to predict a proximity and spatial relationship of the incoming projectile relative to the human.

12. The system of claim 1, wherein the processing circuit is further configured to predict a spatial relationship of a trajectory of a future incoming projectile relative to the human in response to the predicted spatial relationship of the trajectory of the incoming projectile relative to the human.

13. The system of claim 1, wherein the processing circuit is further configured to determine a suggested movement of the human away from the trajectory of the incoming projectile.

14. The system of claim 1, wherein the processing circuit is further configured to determine a suggested no movement by the human to evade the incoming projectile.

15. The system of claim 1, wherein the processing circuit is further configured to:
   receive data indicative of a movement by the human after the transmission of the suggested movement to evade the incoming projectile;
   compare the suggested movement with the data indicative of the movement by the human occurring after notification of the suggested movement to evade;
   determine an updated suggested movement by the human to evade the incoming projectile; and
   wherein the transmitter circuit is configured to transmit the updated suggested movement by the human to evade the incoming projectile.

16. A method implemented in real-time, the method comprising:
   acquiring data indicative of a trajectory of an incoming projectile;
   acquiring data indicative of a location of a human present in a monitored geographic area;
   predicting a spatial relationship of the trajectory of the incoming projectile relative to the location of the human;
   determining a suggested movement by the human to evade the incoming projectile; and
   transmitting the suggested movement to evade the incoming projectile.

17. The method of claim 16, further comprising:
   receiving data indicative of a movement by the human after the transmission of the suggested movement to evade the incoming projectile;
   comparing the suggested movement with the data indicative of the movement by the human occurring after notification of the suggested movement to evade;
   determining an updated suggested movement by the human to evade the incoming projectile; and
   transmitting the updated suggested movement by the human to evade the incoming projectile.

18. A real time system comprising:
a warning device configured to be worn by a human and to provide a notification to the human;
a receiver circuit configured to receive a suggested movement by the human to evade an incoming projectile incoming to a monitored geographic area; and
a processing circuit configured to initiate in the warning device a notification of the received suggested movement by the human to evade the incoming projectile incoming to the monitored geographic area.

19. The system of claim 18, wherein the receiver circuit is configured to be carried or worn by the human.

20. The system of claim 18, wherein the warning device is configured to be worn on an appendage of the human.

21. The system of claim 18, wherein the warning device includes a haptic element configured to generate a tactilely perceptive stimulus to the human.

22. The system of claim 18, wherein the warning device includes a speaker.

23. The system of claim 18, wherein the warning device includes a vibratory element.

24. The system of claim 18, wherein the notification by the warning device includes a suggested movement by the human away from the trajectory of the incoming projectile.

25. The system of claim 18, further comprising:
a head protection gear, wherein the warning device is coupled to the head protection gear.

26. The system of claim 18, further comprising a body position sensor configured to acquire data indicative of a current orientation of a body part of the human.

27. The system of claim 18, wherein the processing circuit is further configured to:
receive the data indicative of a current orientation of a body part of the human;
receive data indicative of a predicted spatial relationship of a trajectory of the incoming projectile relative to the human;
determine a current orientation of the body part of the human relative to the predicted spatial relationship of the trajectory of the incoming projectile; and
initiate a notification by the warning device suggesting a movement by the human to evade the incoming projectile responsive to the current orientation of the body part of the human.

28. The system of claim 18, further comprising:
a transmitter circuit configured to transmit data indicative of a location of the human.

29. The system of claim 28, wherein the transmitter circuit is configured to be carried or worn by the human.

30. A real-time system comprising:
an incoming object sensor configured to acquire data indicative of a trajectory of a projectile incoming to a monitored geographical area;
a processing circuit configured to predict a spatial relationship of the trajectory of the incoming projectile relative to the monitored geographical area; and
a transmitter circuit configured to transmit data indicative of the predicted spatial relationship of the trajectory of the incoming projectile relative to the monitored geographical area.

31. The system of claim 30, wherein the processing circuit is configured to predict in a spatial and temporal relationship of the trajectory of the incoming projectile relative to the monitored geographical area.

\* \* \* \* \*